United States Patent
Shin et al.

(10) Patent No.: US 7,624,311 B2
(45) Date of Patent: Nov. 24, 2009

(54) METHOD AND APPARATUS FOR CONVERTING INTERFACE BETWEEN HIGH SPEED DATA HAVING VARIOUS CAPACITIES

(75) Inventors: Jong Yoon Shin, Daejeon (KR); Hyun Jae Lee, Daejeon (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 201 days.

(21) Appl. No.: 11/947,349

(22) Filed: Nov. 29, 2007

(65) Prior Publication Data

US 2008/0131136 A1 Jun. 5, 2008

(30) Foreign Application Priority Data

Dec. 5, 2006 (KR) ...................... 10-2006-0122662

(51) Int. Cl.
*G06K 5/04* (2006.01)
(52) U.S. Cl. ....................................... 714/700; 398/135
(58) Field of Classification Search ................. 375/371, 375/372; 385/27; 713/503; 714/700; 398/135
See application file for complete search history.

(56) References Cited

U.S. PATENT DOCUMENTS

| | | | |
|---|---|---|---|
| 6,874,107 B2 | 3/2005 | Lesea | |
| 7,245,686 B2 * | 7/2007 | Weiss et al. | 375/372 |
| 7,467,335 B2 * | 12/2008 | Otto et al. | 714/700 |
| 7,500,156 B2 * | 3/2009 | Shin et al. | 714/700 |
| 7,546,494 B2 * | 6/2009 | Haas et al. | 714/700 |
| 2003/0113062 A1 * | 6/2003 | Bonja et al. | 385/27 |
| 2003/0120799 A1 | 6/2003 | Lahav et al. | |
| 2007/0050658 A1 * | 3/2007 | Kuwata | 713/503 |
| 2008/0080654 A1 * | 4/2008 | Klowden et al. | 375/371 |
| 2008/0126888 A1 * | 5/2008 | Haas et al. | 714/700 |

FOREIGN PATENT DOCUMENTS

| | | |
|---|---|---|
| KR | 2001-0089905 | 10/2001 |
| KR | 10-2004-0037558 | 5/2004 |

OTHER PUBLICATIONS

Korean Office Action dated Aug. 6, 2008, for Korean application No. 10-2006-0122662.
Leilei Song: 10-and 40Gb/s Forward Error Correction Devices for Optical Communications; IEEE Journal of Solid-State Circuits, vol. 37, No. 11, Nov. 2002; pp. 1565-1573.

* cited by examiner

*Primary Examiner*—David Ton
(74) *Attorney, Agent, or Firm*—Lowe Hauptman Ham & Berner, LLP

(57) ABSTRACT

Provided are a method and an apparatus for converting an interface between high speed data having various capacities. The apparatus includes a data transmitting part and a data receiving part. The data transmitting part generates a deskew channel having respective timing data of a plurality of data transmitted from a first communicating device, and outputs the generated deskew channel together with the plurality of data to a second communicating device. The data receiving part compares the deskew channel transmitted from the second communicating device with the plurality of data to measure skew values of the data, aligns bits and bytes of the plurality of data using the skew values, and transmits the plurality of data to the first communicating device.

24 Claims, 8 Drawing Sheets

US 7,624,311 B2

METHOD AND APPARATUS FOR CONVERTING INTERFACE BETWEEN HIGH SPEED DATA HAVING VARIOUS CAPACITIES

CLAIM OF PRIORITY

This application claims the benefit of Korean Patent Application No. 10-2006-0122662 filed on Dec. 5, 2006 in the Korean Intellectual Property Office, the disclosure of which is incorporated herein by reference.

BACKGROUND OF THE INVENTION

1. Field of the Invention

The present invention relates to an interface converting apparatus and, more particularly, to a method and an apparatus for converting an interface between high speed data having various capacities, capable of accommodating various high speed data of more than giga byte class, and selectively interfacing the data.

This work was supported by the IT R&D program of MIC/IITA [2006-S-060-01, OTH-based 40 G Multi-service Transmission Technology]

2. Description of the Related Art

As network communication technology gradually develops currently, data having a large capacity as well as data having a small capacity can be transmitted and received via a network. Therefore, a communicating apparatus such as a framer should accommodate and process various data having a large capacity as well as data having a small capacity.

This work was supported by the IT R&D program of MIC/IITA [2006-S-060-01, OTH-based 40 G Multi-service Transmission Technology]

FIG. 1 is a view illustrating a construction of a digital communicating apparatus supporting a 40 giga-byte class data interface function according to a conventional art. The digital communicating apparatus includes an STM-256/OTU3 framer 10, one 40 giga-byte class optical transceiver 101, three 10 giga-byte class optical transceivers 102-104, and four 2.5 giga-byte class optical transceivers 105-108.

The STM-256/OUT3 framer 10 accommodates high speed data having various capacities, that is, STM-16/OTU1 data (referred to as 2.5 giga-byte class data), STM-64/OTU2 data (referred to as 10 giga-byte class data), and STM-256/OTU3 data (referred to as 40 giga-byte class data) to convert the data into an STM-256/OTU3 frame (referred to as a 40 giga-byte class frame) or reproduce the data, and performs a reverse process thereof.

The 40 G-byte class optical transceiver 101 converts 40 giga-byte class data transmitted from the STM-256/OTU3 framer 10 into an optical signal to output the optical signal to a network, or converts an optical signal transmitted from the network into 40 giga-byte class data to transmit the data to the STM-256/OTU3 framer 10.

Each of the 10 giga (G)-byte class optical transceivers 102-104 converts 10 G-byte class data transmitted from the STM-256/OTU3 framer 10 into an optical signal to output the optical signal to the network, or converts an optical signal transmitted from the network into 10 G-byte class data to transmit the data to the STM-256/OTU3 framer 10.

Each of the 2.5 G-byte class optical transceivers 105-108 converts 2.5 G-byte class data transmitted from the STM-256/OTU3 framer 10 into an optical signal to output the optical signal to the network, or converts an optical signal transmitted from the network into 2.5 G-byte class data to transmit the data to the STM-256/OTU3 framer 10.

The above-described framer 10 accommodates all of 40 G-byte class data, 10 G-byte class data, and 2.5 G-byte class data and convert the accommodated data into a 40 G-byte class frame, or inverse-converts a 40 G-byte class frame into one of 40 G-byte class data, 10 G-byte class data, and 2.5 G-byte class data, and transmits the inverse-converted data to a corresponding optical transceiver.

However, a conventional framer separately requires not only interfaces and channels for respective 40 G-byte class data, 10 G-byte class data, and 2.5 G-byte class data but also circuits for supporting the operations of these interfaces and channels. Accordingly, in the conventional framer 10, it is required to determine the kind of high speed data to be actually accommodated, and separately design a circuit for supporting the high speed data.

Therefore, according to the conventional framer, there is a problem that circuits should be selected and interface modules should be designed depending on the kind of data to be accommodated even though the same 40 G-byte class data is generated.

SUMMARY OF THE INVENTION

The present invention has been made to solve the foregoing problems of the prior art and therefore an object of the present invention is to provide a method and an apparatus for converting an interface between high speed data having various capacities, capable of accommodating data having various large capacities and selectively interfacing the data using one circuit.

According to an aspect of the invention, the invention provides an apparatus for converting an interface, the apparatus including: a data transmitting part for generating a deskew channel having respective timing data of a plurality of data transmitted from a first communicating device, and outputting the generated deskew channel together with the plurality of data to a second communicating device; and a data receiving part for comparing the deskew channel transmitted from the second communicating device with the plurality of data to measure skew values of the plurality of data, aligning bits and bytes of the data using the skew values, and transmitting the plurality of data to the first communicating device.

According to another aspect of the invention for realizing the object, there is provided a digital communicating apparatus including: a first communicating device for accommodating data having a second data capacity and a third data capacity as well as a first data capacity using a plurality of channels through which data having the first data capacity is transmitted and received; and an interface converting apparatus for generating a deskew channel when a plurality of data is transmitted from the first communicating device, outputting the deskew channel together with the plurality of data to a second communicating device, removing skew of the plurality of data using the deskew channel when the deskew channel and the data are transmitted from the second communicating device, and transmitting the data to the first communicating device.

According to still another aspect of the invention for realizing the object, there is provided a method for converting an interface, the method including: generating a deskew channel having respective timing data of a plurality of data transmitted from a first communicating device, and outputting the generated deskew channel together with the data to a second communicating device; and comparing the deskew channel transmitted from the second communicating device with the plurality of data to measure skew values of respective data, aligning bits and bytes of the data using the skew values, and transmitting the data to the first communicating device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
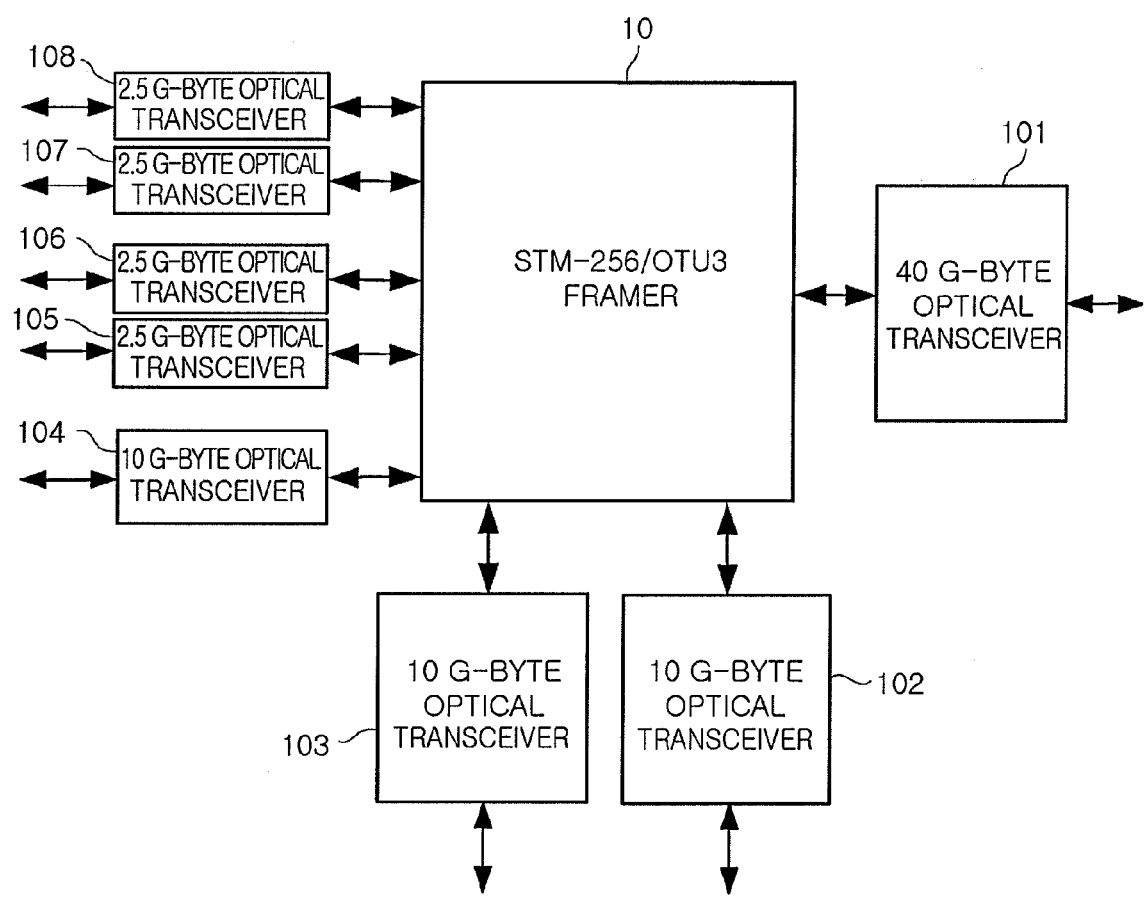
FIG. 1 is a view illustrating a construction of a digital communicating apparatus supporting a 40 giga-byte class data interface function according to a conventional art.

Certain or exemplary embodiments of the present invention will now be described in detail with reference to the accompanying drawings. However, in description of operation principles associated with the embodiments of the present invention, detailed description of a known art or construction is omitted because it may obscure the spirit of the present invention unnecessarily.

Also, like reference numerals refer to like elements throughout the specification.

Figure 2:
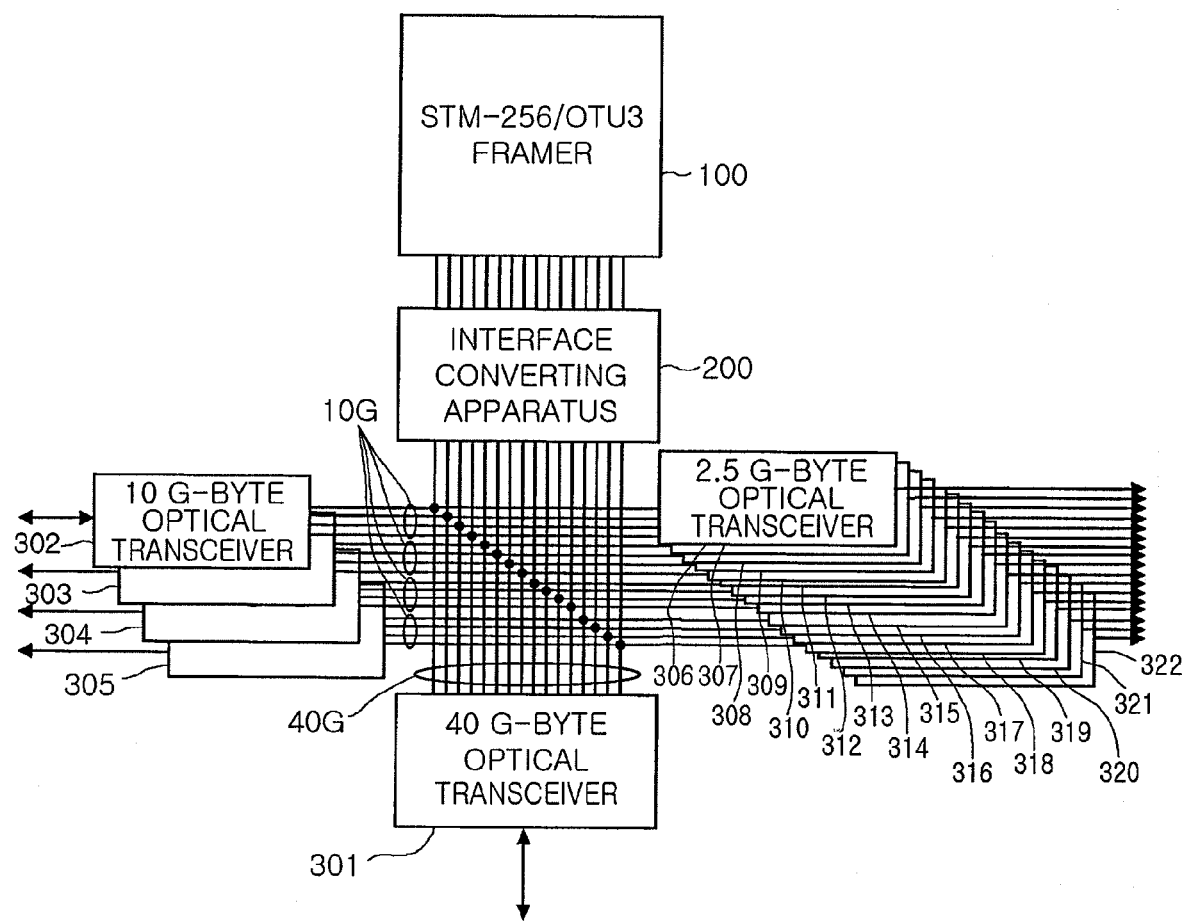
FIG. 2 is a view of a digital communicating apparatus supporting a 40 G-byte class data interface function according to an embodiment of the present invention.

FIG. 2 is a view of a digital communicating apparatus supporting a 40 G-byte class data interface function according to an embodiment of the present invention.

Referring to FIG. 2, the digital communicating apparatus includes an STM-256/OTU3 framer 100, an interface converting apparatus 200, one 40 G-byte class optical transceiver 301, four 10 G-byte class optical transceivers 302-305, and sixteen 2.5 G-byte class optical transceivers 306-322.

At this point, though not shown in FIG. 2, another interface converting apparatus as well as the interface converting apparatus 200 of FIG. 2 could be included in the 40 G-byte class optical transceiver 301 or four 10 G-byte class optical transceivers 302-305 for transmitting and receiving a deskew channel to actually perform an interface converting operation proposed by the present invention. Therefore, the STM-256/OTU3 framer 100 provided within the digital communicating apparatus illustrated in FIG. 2 and connected with the interface converting apparatus 200 is referred to as a first communicating apparatus for convenience in description. Also, though not shown in FIG. 2, the 40 G-byte class optical transceiver 301, the 10 G-byte class optical transceivers 302-305, or the 2.5 G-byte class optical transceivers 306-322 including an interface converting apparatus performing the same function as that of the interface converting apparatus 200 of FIG. 2 are referred to as second communicating apparatuses.

The STM-256/OTU3 framer 100 accommodates sixteen 2.5 G-byte class data, four 10 G-byte class data, or one 40 G-byte class data to convert the data into a 40 G-byte class frame or reproduce the data using sixteen channels through which 2.5 G-byte class data are transmitted or received, and performs a reverse process thereof. At this point, 2.5 G-byte class data are transmitted and received independently through each one channel, 10 G-byte data are transmitted and received through four channels, and 40 G-byte class data are transmitted and received through sixteenth channels.

The interface converting apparatus 200 detects the kind of data transmitted and received between the STM-256/OTU3 framer 100, i.e., the first communicating device, and the second communicating devices 301-305 to determine an interface mode, and interfaces independent 2.5 G-byte data through one channel, interfaces one 10 G-byte class data through four channels, or one 40 G-byte class data through sixteen channels. For this purpose, when receiving a deskew channel and a plurality of data from the second communicating devices, the interface converting apparatus 200 detects and sets a current interface mode using the skew channel, and simultaneously, removes skews of the respective data, and transmits the data to the STM-256/OTU3 framer 100. When a plurality of data are transmitted from the STM-256/OTU3 framer 100, the interface converting apparatus 200 generates a deskew channel corresponding to a current interface mode and transmits the generated deskew channel together with the plurality of data to the second communicating devices.

Here, the interface mode includes a 2.5 G mode, a 10 G mode, and a 40 G mode. The 2.5 G mode is a mode interfacing 2.5 G-byte class data through one channel. The 10 G mode is a mode interfacing 10 G-byte class data through four channels, and the 40 G mode is a mode interfacing 40 G-byte class data through sixteen channels.

Accordingly, the STM-256/OTU3 framer 100 can simultaneously accommodate and process 10 G-byte class data and 40 G-byte class data as well as 2.5 G-byte class data as in the conventional art while having only interfaces and channels for receiving sixteen 2.5 G-byte class data and a circuit for processing the data.

The 40 G-byte class optical transceiver 301 generates 40 G-byte class data whose skews have been removed from 40 G-byte class data transmitted through sixteen channels from the interface converting apparatus 200 using a skew channel, and converts the data into optical signals to output the optical signals to a network, or converts optical signal transmitted from the network into electrical 40 G-byte class data to separate the data into data of sixteen channels, and generates a deskew channel having timing data of respective sixteen data to be transmitted to transmit the timing data together with the sixteen data to the interface converting apparatus 200.

Each of the 10 G-byte class optical transceivers 302-305 generates 10 G-byte class data whose skews have been removed from 10 G-byte class data transmitted through four channels from the interface converting apparatus 200 using a skew channel, and converts the data into optical signals to transmit the optical signals to a network, or converts optical signal transmitted from the network into electrical 10 G-byte class data to separate the data into data of four channels, and generates a deskew channel having timing data of respective four data to be transmitted to transmit the timing data together with the four data to the interface converting apparatus 200.

Each of the 2.5 G-byte class optical transceivers 306-322 converts 2.5 G-byte class data transmitted from the interface converting apparatus 200 into optical signals to transmit the optical signals to the network, or converts optical signals transmitted from the network into 2.5 G-byte class data to transmit the data to the interface converting apparatus 200.

Figure 3:
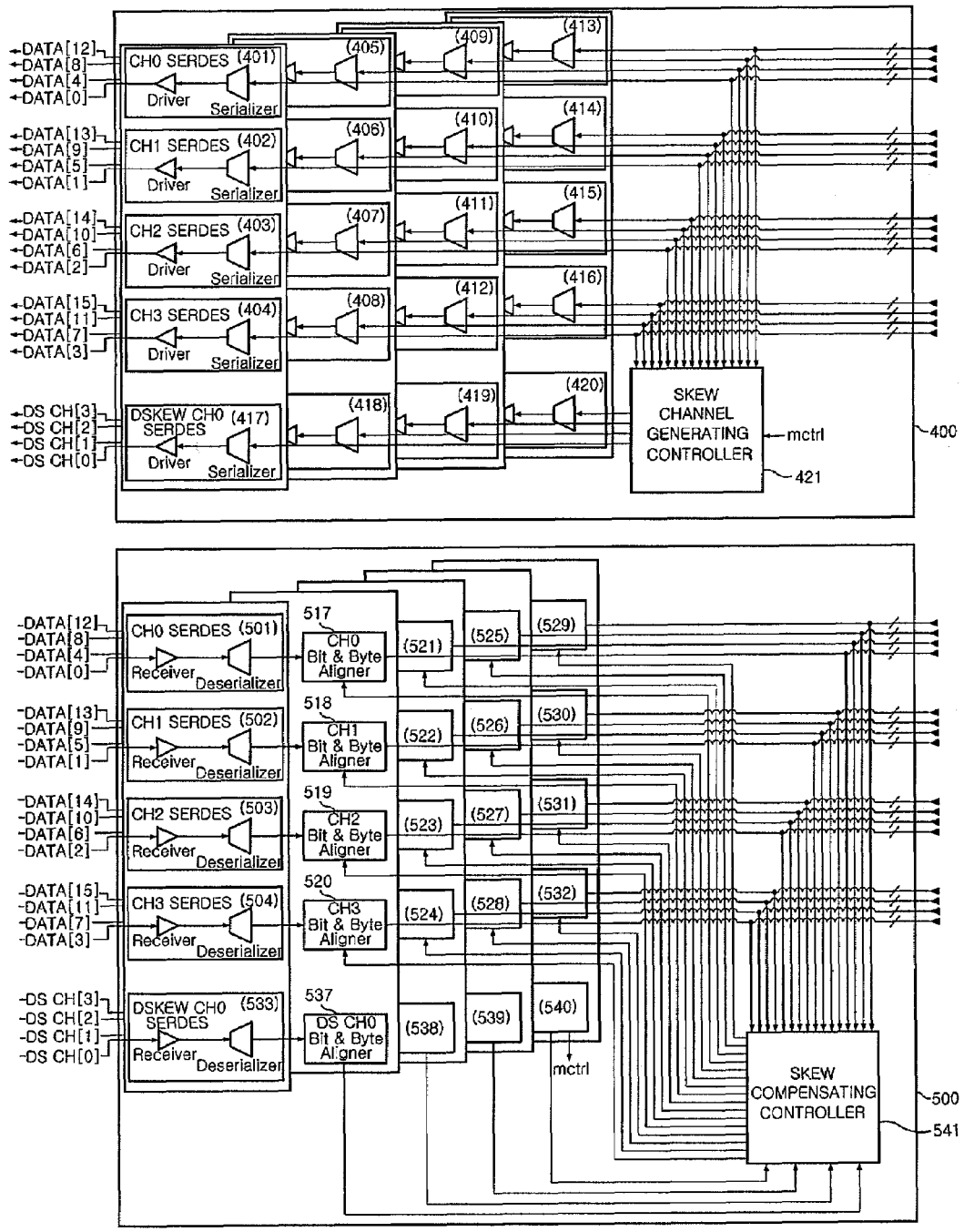
FIG. 3 is a detailed view of a construction of an interface converting apparatus according to an embodiment of the present invention.

FIG. 3 is a detailed view of a construction of an interface converting apparatus according to an embodiment of the present invention.

Referring to FIG. 3, the interface converting apparatus 200 includes a data transmitting part 400 and a data receiving part 500. The data transmitting part 400 includes sixteen transmission serializers/deserializers (SERDESs) 401-416, four deskew channel generating SERDESs 417-420, and a deskew channel generating controller 421. The data receiving part 500 includes sixteen reception SERDESs 501-516, sixteen bit/byte aligners 517-532, four deskew channel obtaining SERDESs 533-536, four deskew channel bit/byte aligners 537-540, and a skew compensating controller 541.

Preferably, the plurality of transmission and reception channels of FIG. 3 can be connected in common to the 40 G-byte class optical transceiver 301, the 10 G-byte class optical transceivers 302-305, and the 2.5 G-byte class optical transceivers 306-322.

The sixteen transmission SERDESs 401 to 416 correspond to sixteen transmission channels CH0-CH15, respectively. Each of the sixteen transmission SERDESs 401 to 416 includes a serializer for serial-converting data parallel-transmitted from the STM-256/OTU3 framer 100, and a driver for outputting serial-converted data to a corresponding transmission channel. Accordingly, during a 2.5 G mode, an independent 2.5 G-byte class data is outputted in the form of a serial data through the one transmission SERDESs 401. During a 10 G mode, one 10 G-byte class data is outputted in the form of a serial data through the four transmission SERDESs 401-404. During a 40 G mode, one 40 G-byte class data is outputted in the form of a serial data through the sixteen transmission SERDESs 401-416.

The four deskew channel generating SERDESs 417-420 are assigned to four units of transmission SERDESs 401-404, 405-408, 409-412, and 413-416, respectively. Each of the four deskew channel generating SERDESs 417-420 includes a serializer for serial-converting header data and timing data provided from the deskew channel generating controller 421 to generate a skew channel, and a driver for outputting the deskew channel to a corresponding transmission channel. Accordingly, during the 10 G mode, the four deskew channel generating SERDES 417-420 serial-convert header data and timing data provided from the deskew channel generating controller 421 to generate a deskew channel for supporting a 10 G mode operation. During the 40 G mode, one deskew channel generating SERDES (e.g., the third deskew channel generating SERDES 420) generates a deskew channel for supporting a 40 G mode operation.

The deskew channel generating controller 421 determines an interface mode in response to a mode control signal 'mctrl'. Also, during the 10 G mode and 40 G mode, four or sixteen data simultaneously transmitted to the four or sixteen transmission SERDESs 401-404 or 401-416 are sequentially extracted according to a predetermined timing, and transmitted together with the header data to a corresponding deskew channel generating SERDES. At this point, the header data is data having frame start data of the skew channel.

On the other hand, during the 2.5 G mode, since each of the plurality of transmission SERDESs 401-416 transmits independent 2.5 G-byte class data and skew of each channel does not need to be compensated for, the above-described extraction operation is suspended, and the deskew channel generating SERDESs 417-420 do not generate a deskew channel or generate a deskew channel having only a frame structure.

The sixteen reception SERDESs 501-516 correspond to sixteen reception channels CH0-CH15, respectively. Each of the sixteen reception SERDESs 501-516 includes a receiver for receiving serial data transmitted from a corresponding reception channel to recover data and clock, and a deserializer for deserializing recovered serial data. Accordingly, during a 2.5 G mode, an independent 2.5 G-byte class data is received and deserialized through the one reception SERDESs 501. During a 10 G mode, one 10 G-byte class data is received and deserialized through the four reception SERDESs 501-504. During a 40 G mode, one 40 G-byte class data is received and deserialized through the sixteen reception SERDESs 501-516.

The sixteen bit/byte aligners 517-532 correspond to sixteen deskew channel obtaining SERDESs 501-516, respectively. Each of the sixteen bit/byte aligners 517-532 aligns bit and byte of data transmitted from a corresponding SERDESs using aligning signal. Accordingly, The sixteen bit/byte aligners 517-532 could output a plurality of data having same timing, although receive one 10 G-byte or 40 G-byte class data through four or sixteen reception SERDESs 501-504 or 501-516. That is, each of the sixteen bit/byte aligners 517-532 remove skew of each of a plurality of channel and output the plurality of data.

The four deskew channel obtaining SERDESs 533-536 are assigned to four units of reception SERDESs 501-504, 505-508, 509-512, and 513-516, respectively. Each of the four deskew channel obtaining SERDESs 533-536 includes a receiver for receiving a deskew channel transmitted through a corresponding reception channel to recover data and clock, and a deserializer for deserializing data of the recovered deskew channel to receive and deserialize the skew channel.

The four deskew channel bit/byte aligners 537-540 correspond to four deskew channel obtaining SERDESs 533-536, respectively. Also, when a deskew channel is transmitted from a corresponding deskew channel obtaining SERDES, a corresponding deskew channel bit/byte aligner aligns bit and byte of the deskew channel using header data, and provides the aligned deskew channel data to the skew compensating controller 541.

At this point, one (e.g., the third deskew channel bit/byte aligner 540) of the four deskew channel bit/byte aligners 537-540 further sets a current interface mode of the interface converting apparatus 200, and informs the set interface mode to the deskew channel generating controller 421 and the skew compensating controller 541. That is, the third deskew channel bit/byte aligner 540 sets the 2.5 G mode as a current interface mode when a third deskew channel DS CH [3] is not received or a deskew channel having only a frame structure is transmitted, sets the 10 G mode as a current interface mode when a deskew channel having the same frame period as that of the deskew channel generated during the 10 G mode, and sets the 40 G mode as a current interface mode when a deskew channel having the same frame period as that of the deskew channel generated during the 40 G mode. Also, when a frame period does not coincide more than three times, the third deskew channel bit/byte aligner 540 judges that a current operating state is an out-of-frame (OOF) state and sets the 2.5 G mode as a current interface mode.

During the 10 G mode and 40 G mode, the skew compensating controller 541 compares data of corresponding deskew channel bit/byte aligners and corresponding bit/byte aligners to measure skew values of a plurality of data. Also, the skew compensating controller 541 generates four or sixteen aligning signals that reflect the measurement results to provide the aligning signals to the four deskew channel bit/byte aligners or the sixteen bit/byte aligners, respectively.

Though the interface mode is detected and set using one of the four deskew channel bit/byte aligners in the above description, the deskew channel compensating controller 541 can perform the above-described functions when needed, of course.

Figure 4A:
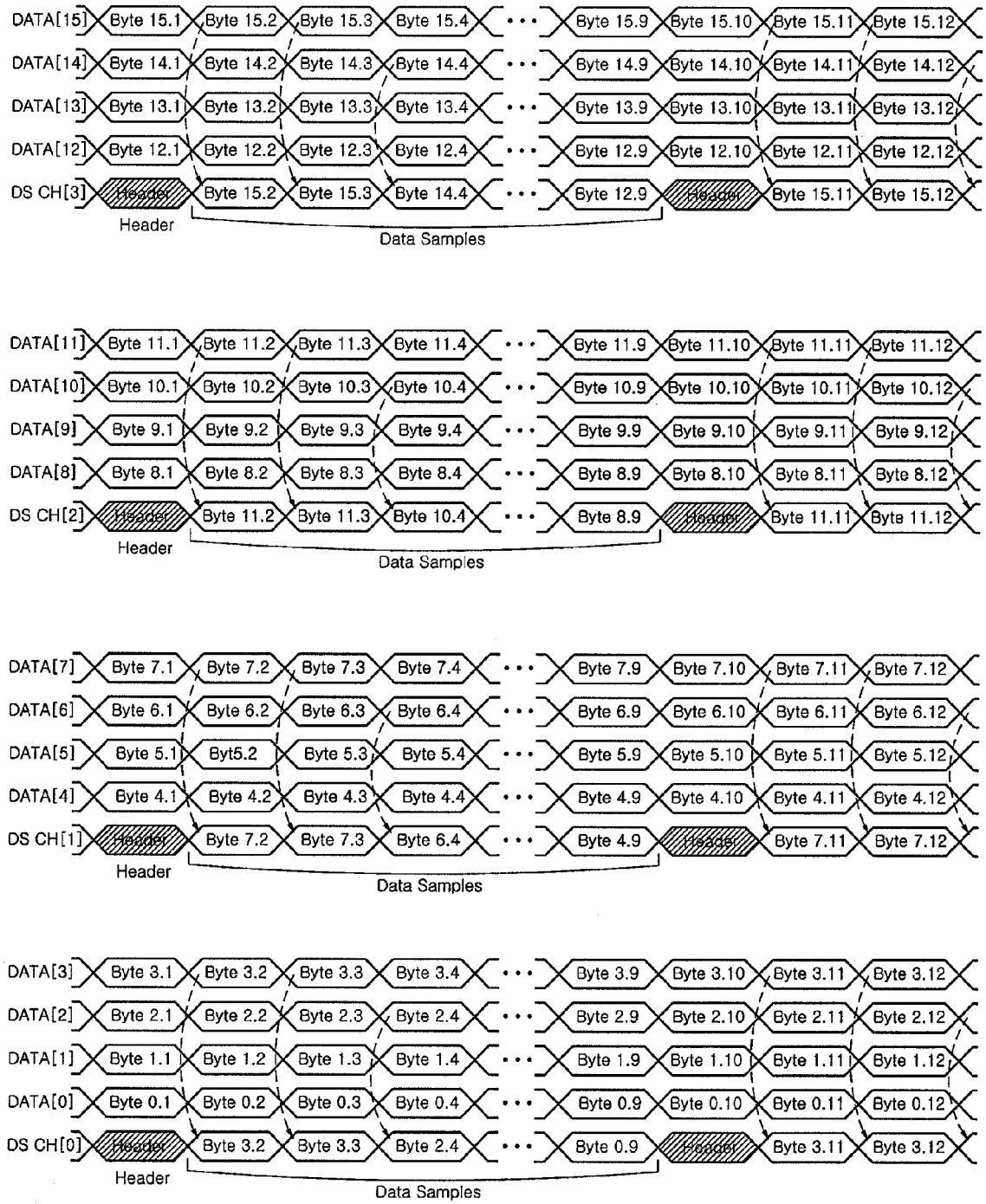
FIG. 4A is a timing diagram explaining a method for generating a deskew channel for a 10 G mode according to an embodiment of the present invention.
Figure 4B:
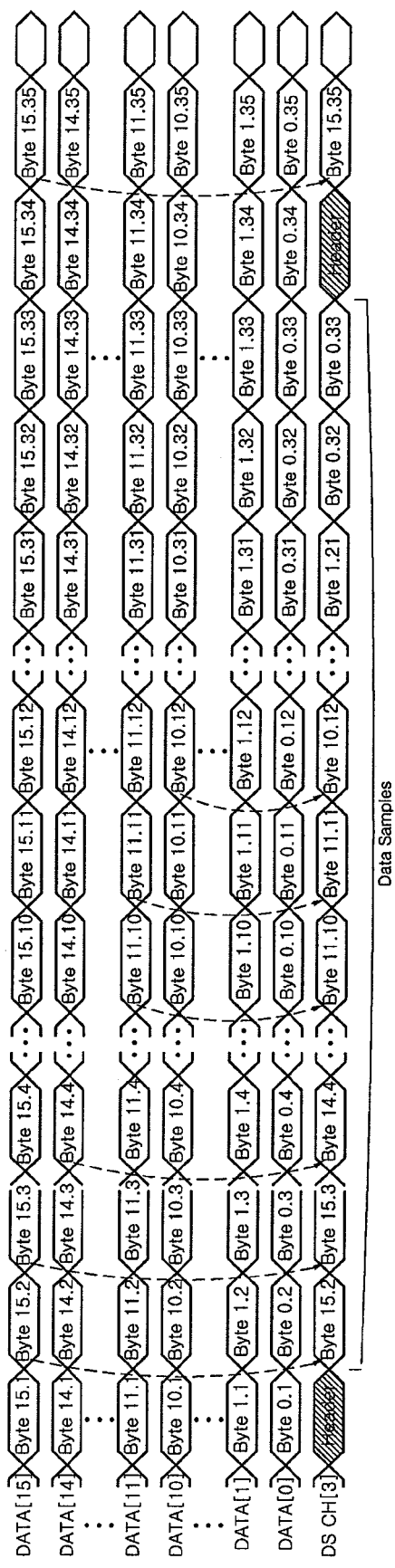
FIG. 4B is a timing diagram explaining a method for generating a deskew channel for a 40 G mode according to an embodiment of the present invention.

FIG. 4A is a timing diagram explaining a method for generating a deskew channel for a 10 G mode according to an embodiment of the present invention, and FIG. 4B is a timing diagram explaining a method for generating a deskew channel for a 40 G mode according to an embodiment of the present invention.

First, a method for generating a zeroth deskew channel DS CH [0] for the 10 G mode will be described with reference to FIG. 4A.

During the 10 G mode, zeroth to third data of DATA [0]-DATA [3] are simultaneously input to the zeroth to third transmission SERDESs 401-404 in order to transmit one 10 G-byte class data through the zeroth to third transmission SERDESs 401-404.

The deskew channel generating controller 421 sequentially obtains the zeroth to third data of DATA [0]-DATA [3] by two bytes according to a predetermined timing, and parallel-transmits the obtained data together with header data to the zeroth deskew channel generating SERDES 417.

The zeroth deskew channel generating SERDES 417 serializes the data transmitted from the deskew channel generating controller 421 to generate the zeroth deskew channel DS CH [0] including a header and data having data order of "byte 15.2, 15.3, 14.4, 14.5, . . . , 12.8, and 12.9".

The above-described operations are performed on other channels of CH[4]-CH[15]. Accordingly, the rest first to third deskew channel generating SERDESs 418-420 generate first to third skew channels DS CH[1]-DS CH[3] using data of DATA[4]-DATA[7], DATA[8]-DATA[11], and DATA[12]-DATA[15] transmitted to corresponding units of four transmission SERDESs 405-408, 409-412, and 413-416, respectively.

Subsequently, referring to FIG. 4B, a method for generating the third deskew channel DS CH[3] for the 40 G mode will be described with reference to FIG. 4B.

During the 40 G mode, sixteen parallel data of DATA[0]-DATA[15] are simultaneously input to the sixteen transmission SERDESs 401-416 in order to transmit one 40 G-byte class data through the sixteen transmission SERDESs 401-416.

The deskew channel generating controller 421 sequentially obtains the zeroth to fifteenth data of DATA[0]-DATA[15] by two bytes according to a predetermined timing using the same method of FIG. 4A, and parallel-transmits the obtained data together with header data to the third deskew channel generating SERDES 417.

The third deskew channel generating SERDES 420 serializes the transmitted data to generate the third deskew channel DS CH[3] including a header and data having data order of "byte 15.2, 15.2, 14.4, 14.5, . . . , 1.32, 0.32, and 0.33".

Figure 5A:
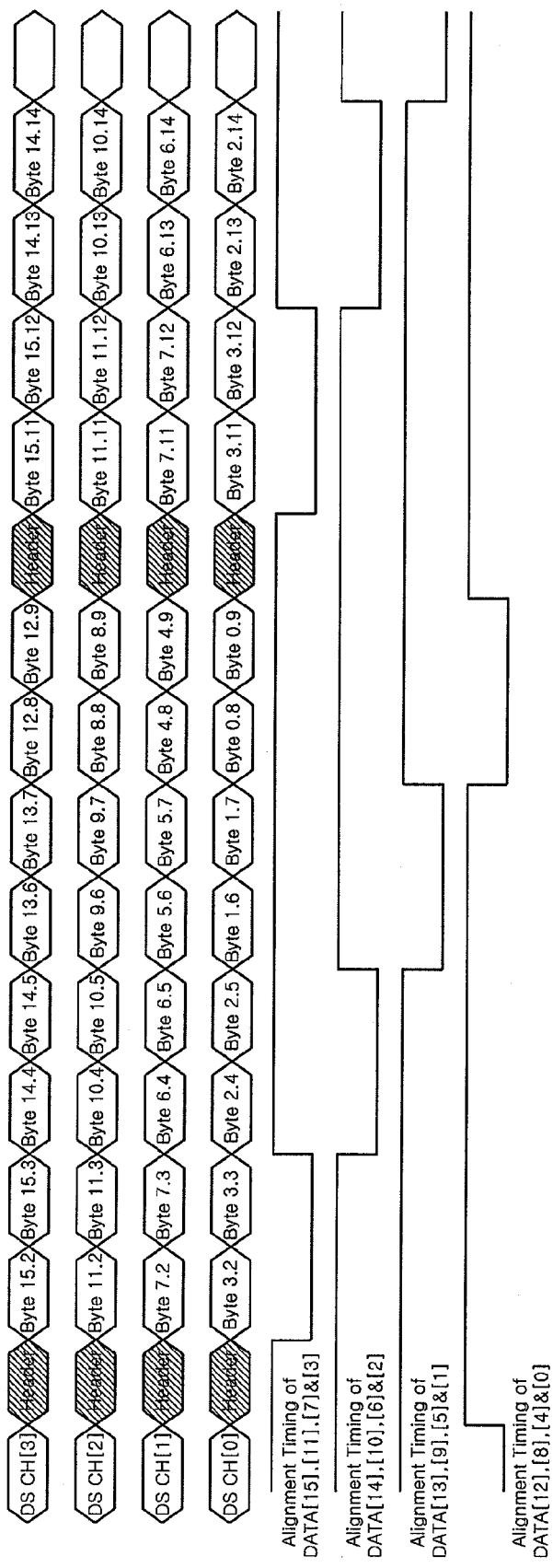
FIG. 5A is a timing diagram explaining a method for generating an aligning signal for a 10 G mode according to an embodiment of the present invention.
Figure 5B:
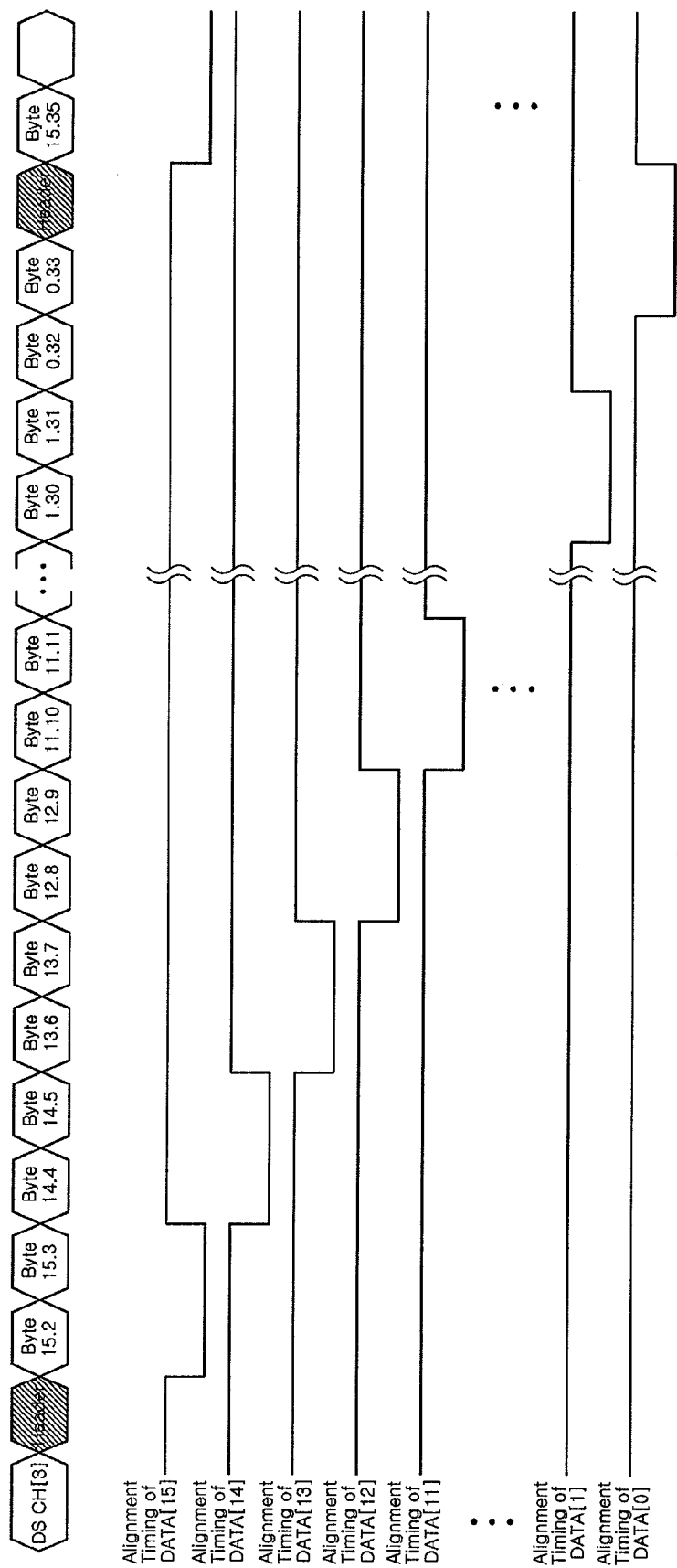
FIG. 5B is a timing diagram explaining a method for generating an aligning signal for a 40 G mode according to an embodiment of the present invention.

FIG. 5A is a timing diagram explaining a method for generating an aligning signal for a 10 G mode according to an embodiment of the present invention, and FIG. 5B is a timing diagram explaining a method for generating an aligning signal for a 40 G mode according to an embodiment of the present invention.

First, a method for generating zeroth to third aligning signals of DATA[0]-DATA[3] for the 10 G mode will be described with reference to FIG. 5A.

During the 10 G mode, the zeroth deskew channel DS CH[0] is input through the zeroth deskew channel obtaining SERDES 533, and zeroth to third serial data are received through the zeroth to third reception SERDES 501-504.

The zeroth deskew channel obtaining SERDES 533 and the zeroth deskew channel bit/byte aligner 537 parallel-output header data and data having data order of "byte 15.2, 15.3, 14.4, 14.5, . . . , 12.8, and 12.9". Each of the zeroth to third reception SERDESs 501-504 parallel-outputs data having the same data order as that of the zeroth to third data of DATA [0]-DATA[3] of FIG. 4A.

The skew compensating controller 541 sequentially compares data of the zeroth deskew channel DS CH[0] with the zeroth to third data of DATA[0]-DATA[3] by two bytes to check whether skew is generated. Also, the skew compensating controller 541 generates zeroth to third aligning signals of DATA[0]-DATA[3] that reflect the comparison results.

At this point, the aligning signal has a low level when data of a corresponding deskew channel coincides with data of reception channels, and has a high level when data of a corresponding deskew channel does not coincide with data of reception channels. Accordingly, the zeroth to third bit/byte aligners 517-520 synchronize data input to falling edges of zeroth to third aligning signals to align bits and bytes of the zeroth to third data.

Since the rest fourth to fifteenth aligning signals of DATA [4]-DATA[15] are generated through the above-described process, detailed description thereof will be omitted.

Subsequently, a method for generating a third deskew channel DS CH[3] for the 40 G mode will be described with reference to FIG. 5B.

During the 40 G mode, the third deskew channel DS CH[3] is input through the third deskew channel obtaining SERDES 536 (not shown), and zeroth to fifteenth serial data are received through the zeroth to fifteenth reception SERDES 501-516.

The third deskew channel obtaining SERDES 536 and the third deskew channel bit/byte aligner 540 parallel-output header data and data having data order of "byte 15.2, 15.3, 14.4, 14.5, . . . , 1.31, 0.32, and 0.33". Each of the zeroth to fifteenth reception SERDESs 501-516 parallel-outputs data having the same data order as that of the zeroth to fifteenth data of DATA[0]-DATA[15] of FIG. 4B.

The skew compensating controller 541 sequentially compares data of the third deskew channel DS CH[3] with the zeroth to fifteenth data of DATA[0]-DATA[15] by two bytes as in FIG. 5A to check whether skew is generated. Also, the skew compensating controller 541 generates zeroth to fifteenth aligning signals of DATA[0]-DATA[15] that reflect the comparison results.

Accordingly, the zeroth to fifteenth bit/byte aligners 517-532 synchronize data input to falling edges of zeroth to fifteenth aligning signals to align bits and bytes of the zeroth to fifteenth data.

Figure 6:
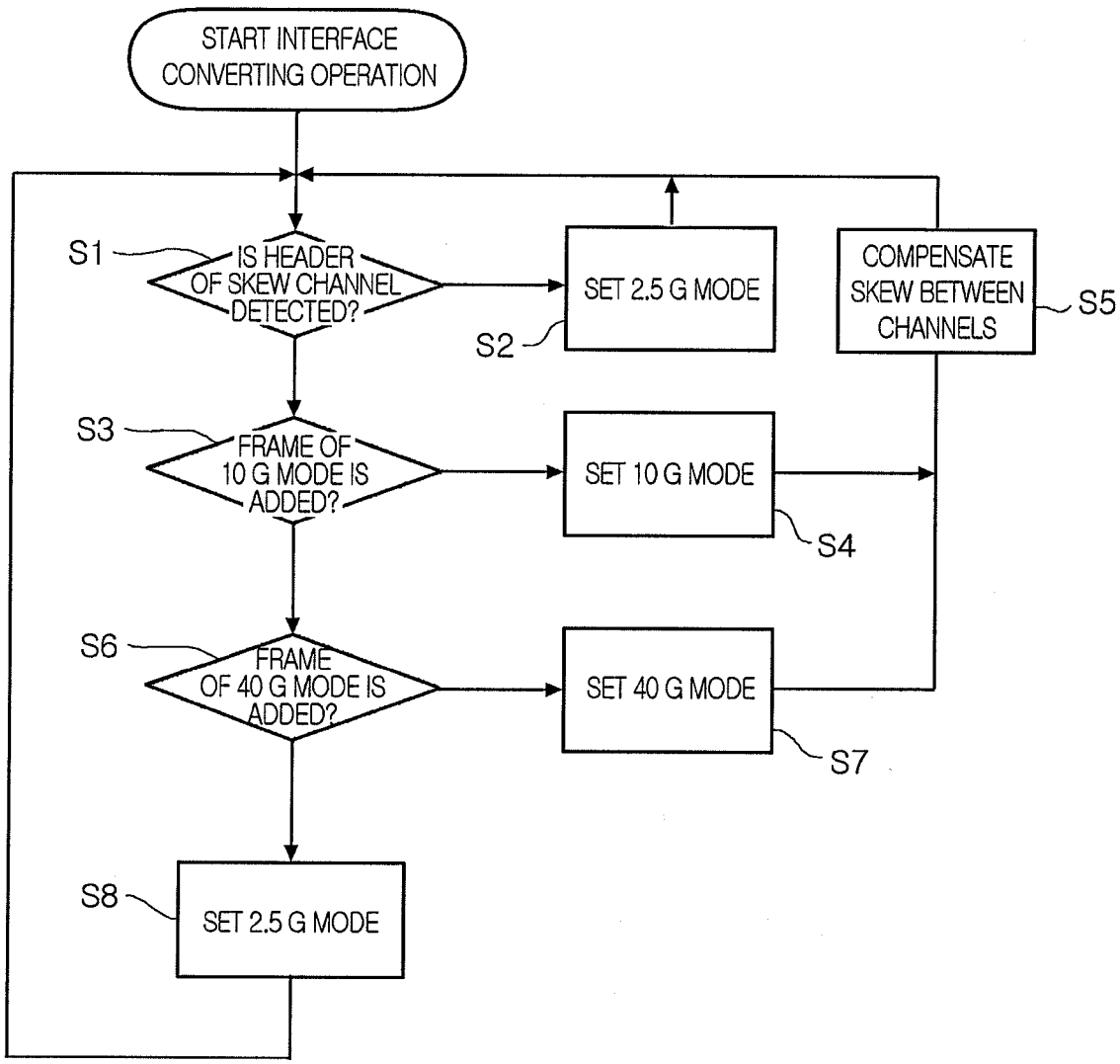
FIG. 6 is a flowchart explaining an operation of converting an interface according to an embodiment of the present invention.

FIG. 6 is a flowchart explaining an operation of converting an interface according to an embodiment of the present invention.

When a predetermined number of signals together with a deskew channel are received from the outside through a predetermined number of channels, the interface converting apparatus detects header data of the deskew channel to obtain a frame period of the deskew channel (S1).

When the frame period of the deskew channel is not obtained in S1, the interface converting apparatus confirms that a mode is the 2.5 G mode where a deskew channel is not generated or a deskew channel having only a frame structure is generated and sets an interface mode to the 2.5 G mode (S2). During the 2.5 G mode, since a separate skew compensating operation is not required as described above, a skew compensating operation is not performed on input signals.

When the frame period obtained in S1 coincides with a frame period of a deskew channel generated during the 10 G mode (S3), the interface converting apparatus judges that 10 G-byte class data is being transmitted from the outside and sets the interface mode to the 10 G mode (S4).

At this point, the interface converting apparatus performs the skew compensating operation to align bits and bytes of signals input through a predetermined number of channels, i.e., four channels and synchronize four data, and outputs one 10 G-byte class data.

Accordingly, the interface converting apparatus generates four aligning signals using the skew channel, aligns bits and bytes of data input through the four channels to synchronize the four data, and provides one 10 G-byte class data to the STM-256/OTU3 framer 100 (S5).

When the frame period obtained in S1 coincides with a frame period of a deskew channel generated during the 40 G mode (S6), the interface converting apparatus judges that 40 G-byte class data is being transmitted from the outside and sets the interface mode to the 40 G mode (S7).

The interface converting apparatus performs the operation S5 to perform the skew compensating operation to align bits and bytes of data input through a predetermined number of channels, i.e., sixteen channels and synchronize sixteen data, and outputs one 40 G-byte class data (S5).

On the other hand, when the frame period obtained in S1 does not coincide with a frame period of a currently set interface mode more than three times, the interface converting apparatus judges that a current operating state is an OOF state and sets the 2.5 G mode as a current interface mode (S8).

Though the interface converting apparatus selectively interfaces only 2.5 G-byte class data, 10 G-byte class data, and 40 G-byte class data in the above description, the interface converting apparatus can support an interfacing operation between various data having various capacities by varying a data capacity of the SERDES when needed, of course.

For example, the interface converting apparatus can selectively interface 10 G-byte class data, 40 G-byte class data, and 160 G-byte class data by replacing the 2.5-class SERDES with 10-class SERDES.

Also, though the STM-256/OTU3 framer has been selected as a communicating apparatus using the interface converting apparatus in the above description for convenience in description, all kinds of communicating apparatus accommodating various data having different data capacities and performing an operation using the data can be applied under actual operating environments.

As described above, a method and an apparatus for converting an interface between high speed data having various data capacities according to the present invention accommodate various data having large data capacities and selectively interfaces the data via one circuit. Accordingly, a communicating apparatus that uses an interface converting apparatus of the present invention can stably perform an operation on all of data having various data capacities using interfaces and channels for accommodating data having relatively low capacity, and a corresponding circuit alone.

While the present invention has been shown and described in connection with the preferred embodiments, it will be apparent to those skilled in the art that modifications and variations can be made without departing from the spirit and scope of the invention as defined by the appended claims.

What is claimed is:

1. An apparatus for converting an interface, the apparatus comprising:
a data transmitting part for generating a deskew channel having respective timing data of a plurality of data transmitted from a first communicating device, and outputting the generated deskew channel together with the plurality of data to a second communicating device; and
a data receiving part for comparing the deskew channel transmitted from the second communicating device with the plurality of data to measure skew values of the plurality of data, aligning bits and bytes of the data using the skew values, and transmitting the data to the first communicating device.

2. The apparatus according to claim 1, wherein the data transmitting part comprises:
a plurality of transmitters for serializing the plurality of data transmitted in parallel from the first communicating device, and outputting the data to the second communicating device;
a deskew channel generating controller for sequentially extracting respective timing data of the plurality of data to transmit the timing data together with header data in parallel during an upper ranking mode, and operating in a stand-by state during a lower ranking mode; and
a deskew channel generator for serializing the header data and the timing data transmitted in parallel from the deskew channel generating controller to generate the deskew channel and transmitting the deskew channel to the second communicating device during the upper ranking mode.

3. The apparatus according to claim 2, wherein the deskew channel generator further has a function of generating no deskew channel or generating the deskew channel having only a frame structure during the lower ranking mode.

4. The apparatus according to claim 2, wherein the lower ranking mode comprises a mode for interfacing data having an independent first data capacity through one transmitter;
the upper ranking mode comprises a first upper ranking mode and a second upper ranking mode,
the first upper ranking mode being a mode for interfacing data having a second data capacity through four transmitters, the second upper ranking mode being a mode for interfacing data having a third data capacity through sixteen transmitters; and
data capacities increase in order of the first data capacity, the second data capacity, and the third data capacity.

5. The apparatus according to claim 4, wherein the deskew channel generating controller sequentially extracts timing data of four data transmitted in parallel to the four transmitters, and transmits the timing data together with the header data in parallel during the first upper ranking mode; and the deskew channel generating controller sequentially extracts timing data of sixteen data transmitted to the sixteen transmitters, and transmits the timing data together with the header data in parallel during the second upper ranking mode.

6. The apparatus according to claim 4, wherein the deskew channel generator serializes the header data and the four timing data to generate the deskew channel during the first upper ranking mode, and serializes the header data and the sixteen timing data to generate the deskew channel during the second upper ranking mode.

7. The apparatus according to claim 4, wherein the lower ranking mode is a mode for interfacing 2.5 G(giga)-byte class data, the first upper ranking mode is a mode for interfacing 10 G-byte class data, and the second upper ranking mode is a mode for interfacing 40 G-byte class data.

8. The apparatus according to claim 4, wherein the lower ranking mode is a mode for interfacing 10 G(giga)-byte class data, the first upper ranking mode is a mode for interfacing 40 G-byte class data, and the second upper ranking mode is a mode for interfacing 160 G-byte class data.

9. The apparatus according to claim 2, wherein the data receiving part comprises:
   a plurality of receivers and aligners deserializing the plurality of data transmitted in series from the second communicating device, and aligning bits and bytes of the deserialized data in response to a plurality of aligning signals;
   deskew channel receiver and aligner for deserializing the deskew channel transmitted in series from the second communicating device, and analyzing a transmission period of header data of the deskew channel to set one of the upper ranking mode and the lower ranking mode; and
   a skew compensating controller for sequentially comparing the deserialized deskew channel with the deserialized data to generate the plurality of aligning signals having skew compensating information during the upper ranking mode.

10. The apparatus according to claim 9, wherein each of the plurality of receivers and aligners comprises:
    a plurality of receivers for deserializing the plurality of data, respectively, transmitted in series from the second communicating device; and
    a plurality of bit/byte aligners for aligning bits and bytes of the deserialized data, respectively, to remove skew of the deserialized data in response to the plurality of aligning signals, and outputting the data to the first communicating device.

11. The apparatus according to claim 9, wherein the deskew channel receiver and aligner comprises:
    a deskew channel receiver for receiving and deserializing the skew channel; and
    a deskew channel bit/byte aligner for aligning bits and bytes of the deserialized deskew channel using header data of the deserialized skew channel, and simultaneously, setting an interface mode.

12. The apparatus according to claim 9, wherein the skew compensating controller sequentially compares the deskew channel with the four data to generate the four aligning signals during the first upper ranking mode, and sequentially compares the deskew channel with the sixteen data to generate the sixteen aligning signals during the second upper ranking mode.

13. A digital communicating apparatus comprising:
    a first communicating device for accommodating data having a second data capacity and a third data capacity as well as a first data capacity using a plurality of channels through which data having the first data capacity is transmitted and received; and
    an interface converting apparatus for generating a deskew channel when a plurality of data is transmitted from the first communicating device, outputting the deskew channel together with the plurality of data to a second communicating device, removing skew of the plurality of data using the deskew channel when the deskew channel and the data are transmitted from the second communicating device, and transmitting the data to the first communicating device.

14. A method for converting an interface, the method comprising:
    generating a deskew channel having respective timing data of a plurality of data transmitted from a first communicating device, and outputting the generated deskew channel together with the data to a second communicating device; and
    comparing the deskew channel transmitted from the second communicating device with the plurality of data to measure skew values of the plurality of data, aligning bits and bytes of the data using the skew values, and transmitting the data to the first communicating device.

15. The method according to claim 14, wherein the outputting of the generated deskew channel together with the data comprises:
    sequentially extracting respective timing data of the plurality of data during an upper ranking mode, and stopping the extracting during an lower ranking mode; and
    generating the deskew channel including header data and the plurality of data, and outputting the deskew channel and the plurality of data to the second communicating device during the upper ranking mode.

16. The method according to claim 15, wherein the outputting of the generated deskew channel together with the data further comprises: outputting only the plurality of data to the second communicating device during the lower ranking mode.

17. The method according to claim 15, wherein the outputting of the generated deskew channel together with the data further comprises: outputting the deskew channel having only a frame structure and the plurality of data to the second communicating device.

18. The method according to claim 15, wherein the lower ranking mode comprises a mode for interfacing data having an independent first data capacity through one transmitter;
    the upper ranking mode comprises a first upper ranking mode and a second upper ranking mode,
    the first upper ranking mode being a mode for interfacing data having a second data capacity through four transmitters, the second upper ranking mode being a mode for interfacing data having a third data capacity through sixteen transmitters; and
    data capacities increase in order of the first data capacity, the second data capacity, and the third data capacity.

19. The method according to claim 18, wherein the sequentially extracting respective timing data comprises: extracting the respective timing data from four data during the first upper ranking mode and extracting the respective timing data from sixteen data during the second upper ranking mode.

20. The method according to claim 18, wherein the generating of the deskew channel comprises:
    serializing the header data and four timing data to generate the deskew channel during the first upper ranking mode; and
    serializing the header data and sixteen timing data to generate the deskew channel during the second upper ranking mode.

21. The method according to claim 18, wherein the comparing of the deskew channel comprises:
    receiving the plurality of data and the deskew channel transmitted from the second communicating device, and analyzing a transmission period of the deskew channel and the header data to set an interface mode;
    sequentially comparing the deskew channel with the received data to generate a plurality of aligning signals having skew compensating information; and
    aligning bits and bytes of the received data in response to the plurality of aligning signals.

22. The method according to claim 21, wherein the sequentially comparing of the deskew channel with the received data comprises: sequentially comparing the deskew channel with four data to generate four aligning signals having the skew compensating information during the first upper ranking mode, and sequentially comparing the deskew channel with sixteen data to generate sixteen aligning signals having the skew compensating information during the second upper ranking mode.

23. The method according to claim 18, wherein the lower ranking mode is a mode for interfacing 2.5 G-byte class data, the first upper ranking mode is a mode for interfacing 10 G-byte class data, and the second upper ranking mode is a mode for interfacing 40 G-byte class data.

24. The method according to claim 18, wherein the lower ranking mode is a mode for interfacing 10 G-byte class data, the first upper ranking mode is a mode for interfacing 40 G-byte class data, and the second upper ranking mode is a mode for interfacing 160 G-byte class data.

* * * * *